US009973967B2

(12) United States Patent
Ratasuk et al.

(10) Patent No.: US 9,973,967 B2
(45) Date of Patent: May 15, 2018

(54) RADIO OPERATIONS IN A CARRIER AGGREGATION SYSTEM (71) Applicant: NOKIA SOLUTIONS AND NETWORKS OY, Espoo (FI)

(72) Inventors: Rapeepat Ratasuk, Hoffman Estates, IL (US); Nitin Mangalvedhe, Hoffman Estates, IL (US); Mikko Aleksi Uusitalo, Helsinki (FI); Antti Sorri, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 506 days.

(21) Appl. No.: 14/361,025

(22) PCT Filed: Dec. 14, 2012

(86) PCT No.: PCT/EP2012/075530
§ 371 (c)(1),
(2) Date: May 28, 2014

(87) PCT Pub. No.: WO2013/087835
PCT Pub. Date: Jun. 20, 2013

(65) Prior Publication Data
US 2014/0335876 A1 Nov. 13, 2014

Related U.S. Application Data (60) Provisional application No. 61/570,909, filed on Dec. 15, 2011.

(51) Int. Cl.
*H04W 28/04* (2009.01)
*H04W 16/14* (2009.01)
(Continued)

(52) U.S. Cl.
CPC .......... *H04W 28/044* (2013.01); *H04L 5/001* (2013.01); *H04W 16/14* (2013.01);
(Continued)

(58) Field of Classification Search
CPC ............... H04W 16/14; H04W 72/042; H04W 72/0453; H04W 84/12; H04W 88/06;
(Continued)

(56) References Cited

U.S. PATENT DOCUMENTS

2007/0047461 A1   3/2007  Seo et al.
2009/0185632 A1*  7/2009  Cai ..................... H04L 5/0044
                                                      375/260
(Continued)

FOREIGN PATENT DOCUMENTS

GB    2477649    *   3/2011
GB    2477649 A      8/2011
(Continued)

OTHER PUBLICATIONS

English translation of Office Action dated Feb. 2, 2018 corresponding to Chinese Patent Application No. 201280061581.9.*
(Continued)

*Primary Examiner* — George Eng
*Assistant Examiner* — Jing Gao
(74) *Attorney, Agent, or Firm* — Squire Patton Boggs (US) LLP (57) ABSTRACT A method comprises, in a carrier aggregation system having multiple component carriers, utilizing an air interface based collision avoidance procedure on at least one component carrier that is associated to a cellular radio access technology to check that a radio resource in the at least one component carrier is available; and thereafter communicating on the
(Continued)

radio resource using the cellular radio access technology only if the check reveals that the radio resource is available.

11 Claims, 5 Drawing Sheets

(51) Int. Cl.
*H04W 74/08* (2009.01)
*H04W 72/04* (2009.01)
*H04L 5/00* (2006.01)
*H04W 28/06* (2009.01)
*H04W 72/00* (2009.01)
*H04L 1/18* (2006.01)

(52) U.S. Cl.
CPC ... *H04W 72/0486* (2013.01); *H04W 74/0816* (2013.01); *H04L 1/1861* (2013.01); *H04W 28/06* (2013.01); *H04W 72/00* (2013.01)

(58) Field of Classification Search
CPC .............. H04W 72/04; H04W 72/082; H04W 74/0808; H04W 72/02; H04W 28/044; H04W 72/0486; H04W 74/0816; H04W 28/06; H04W 72/00; H04L 5/001; H04L 1/1861
USPC ......................................... 455/450
See application file for complete search history.

(56) References Cited

U.S. PATENT DOCUMENTS

| | | | | |
|---|---|---|---|---|
| 2010/0091716 | A1* | 4/2010 | Bonta | H04W 4/20 370/329 |
| 2011/0128895 | A1* | 6/2011 | Sadek | H04W 16/14 370/280 |
| 2011/0287794 | A1 | 11/2011 | Koskela et al. | |
| 2012/0082152 | A1* | 4/2012 | Baldemair | H04W 56/0015 370/350 |

FOREIGN PATENT DOCUMENTS

| | | | |
|---|---|---|---|
| WO | WO 2006/045097 A2 | 4/2006 | |
| WO | WO 2013006988 A1 * | 1/2013 | ............ H04W 16/14 |
| WO | WO 2013013409 A1 * | 1/2013 | .......... H04W 28/065 |

OTHER PUBLICATIONS 802.11-2007 IEEE Standard for Information technology—Telecommunications and information exchange between systems—Local and metropolitan area networks—Specific requirements, Part 11: Wireless LAN Medium Access Control (MAC) and Physical Layer (PHY) Specifications, IEEE Computer Society, Sponsored by the LAN/MAN Standards Committee, IEEE Std 802.11™-2007 (Revision of IEEE Std 802.11-1999), 1231 pages.
Rahman et al., "License-exempt LTE systems for secondary spectrum usage: scenarios and first assessment", 2011 IEEE International Symposium on Dynamic Spectrum Access Networks (DySPAN), pp. 349-358.
Mjeku et al., "Analysis of the Request to Send/Clear to Send Exchange in WLAN Over Fiber Networks", Journal of Lightwave Technology, vol. 26, No. 15, Aug. 1, 2008, pp. 2531-2539.
Leung et al., "Outdoor IEEE 802.11 Cellular Networks: MAC Protocol Design and Performance", IEEE International Conference on Communications 2002, pp. 595-599.
Ratasuk et al., "License-Exempt LTE Deployment in Heterogeneous Network", Wireless Communication Systems (ISWCS), 2012 International Symposium on, IEEE, Aug. 28, 2012 (Aug. 28, 2012), pp. 246-250, XP032263759, DOI: 10.1109/ISWCS.2012.6328367 ISBN: 978-1-4673-0761-1.
International Search Report dated Mar. 11, 2013 corresponding to International Patent Application No. PCT/EP2012/075530.
Chinese Office Action application No. 201280061581.9 dated May 27, 2017.
Office Action dated Feb. 2, 2018 corresponding to Chinese Patent Application No. 201280061581.9.

* cited by examiner

802: in a carrier aggregation system comprising multiple component carriers CCs, utilize an air interface based collision avoidance procedure on at least one CC (e.g., SCC in license exempt band) associated with a cellular radio access technology to check that a radio resource in the at least one CC is not in use or reserved 804: communicate on the radio resource utilizing the cellular radio access technology only if the check reveals that the radio resource is not in use or reserved 806: collision avoidance procedure = listen before transmit sensing interval which is m predetermined symbols of each $k^{th}$ subframe & the subframe is defined by the cellular radio access technology 808: predetermined symbol = last symbol of each $k^{th}$ subframe (m=1, punctured); radio resource = PDSCH or PUSCH allocated to the UE by a PDCCH in PCC 810: subframes of the SCC are time aligned with subframes of the PCC, or are offset in time from subframes of the PCC 812: the collision avoidance procedure has a short listen before transmit sensing interval and a long listen before transmit sensing interval 814: collision avoidance procedure = sending on the SCC at least one of a RTS and a CTS message to indicate that the SCC/radio resource is reserved

RADIO OPERATIONS IN A CARRIER AGGREGATION SYSTEM

TECHNICAL FIELD

The exemplary and non-limiting embodiments of this invention relate generally to wireless communication systems, methods, devices and computer programs and, more specifically relate to radio operations using a cellular radio access technology in a carrier aggregation system.

BACKGROUND

Acronyms used in this document are expanded below following the detailed description section.

Recent expansion in wireless traffic volume will require the network operators to continue increasing their wireless capacity. One promising technique is to use license exempt frequency spectrum, sometimes also termed unlicensed band(s) or shared band(s). Examples of such license exempt bands include the ISM band in which IEEE 802.11 type networks (hereafter, WLAN) currently operate, and also what is known as television whitespaces TVWS, which is a very large chunk of spectrum.

This is not a simple task in that since the spectrum is license exempt it will be in simultaneous use by different users operating according to different RATs such as LTE and WLAN. Recent discussions in the 3GPP indicate the solution lies in better cooperation between the LTE and WLAN systems for the case in which different users operating under these different RATs are operating in the license exempt spectrum.

Figure 1:
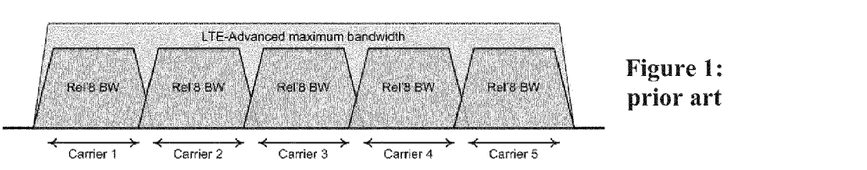
FIG. 1 is a schematic diagram of a radio spectrum in which cross-scheduling can be employed, in which five component carrier bandwidths are aggregated into a single LTE-Advanced bandwidth.

FIG. 1 illustrates in general the concept of carrier aggregation in the LTE system. The whole bandwidth is divided into multiple component carriers. Each UE in the cell will be configured for one primary component carrier or PCC. If a UE is not capable of CA operation it will be assigned a single CC that is backward compatible with 3GPP Release 8. CA-capable UEs are assigned one PCC and may be configured also with one or more secondary CCs or SCCs. Relevant to some embodiments of these teachings one of those SCCs may utilize the license exempt frequencies. While each CC of FIG. 1 is backwards compatible with Release 8, that is but one example and in different CA deployments the bandwidths of the CCs may differ and not all need be backward compatible, and in fact a SCC in the license exempt band will not be backward compatible with Release 8.

Prior art approaches to relieving traffic from the licensed spectrum was to have the UE offload some of its traffic to a WLAN access point, which of course required that the offloading UE have both a LTE and a WLAN radio. Whether or not the UE remains attached to the LTE system in this scenario, WLAN simply cannot support certain features such as handing over an ongoing voice over IP call to a LTE system, meaning there will either be a service interruption or the traffic must be filtered by type before being subject to WLAN offloaded. So for unlicensed band offloading it is desirable to deploy LTE to ensure service continuity, reduce the operator cost of deploying multiple systems, reduce the need to support multiple radio technologies in the handset/UE, and take advantage of LTE-Advanced features that increase its capacity and throughput such as for example carrier aggregation, cooperative multipoint transmissions CoMP, and enhanced inter-cell interference coordination eICIC. Additionally, deploying only LTE will provide better spectral efficiency and control signal optimization compared to LTE and WLAN separately. In-device coexistence is also better with LTE-only deployment.

But LTE is not designed for unlicensed deployment, and even so there is no exclusive control over the license exempt spectrum by the LTE network which means there may still be other UEs operating in that spectrum on another RAT such as WLAN. Some solutions deploy a coexistence manager to actively coordinate among the various RAT operators utilizing the license exempt band as to who will have temporary rights to which channels. As will be detailed below, these teachings take a different course which requires no such active coordination among the various RATs.

SUMMARY

Various aspects of examples of the invention are set out in the claims.

According to a first aspect of the present invention, a method comprises, in a carrier aggregation system comprising multiple component carriers, utilizing an air interface based collision avoidance procedure on at least one component carrier that is associated to a cellular radio access technology to check that a radio resource in the at least one component carrier is available; and thereafter communicating on the radio resource using the cellular radio access technology only if the check reveals that the radio resource is available.

According to a method according to the first aspect, the carrier aggregation system may comprise a primary component carrier in a licensed band, and the at least one component carrier may be a secondary component carrier in a license exempt band.

A scheduling grant for the radio resource in the secondary component carrier in the license exempt band may be sent from the primary component carrier in the licensed band.

The collision avoidance procedure may comprise a listen before transmit sensing interval to check if the radio resource is not in use, and a subframe may be defined by the cellular radio access technology.

The listen before transmit sensing interval may comprise m predetermined symbols which repeats in each $k^{th}$ subframe, where m and k may be each a positive integer.

m=1 and the predetermined symbol may be a last symbol of each $k^{th}$ subframe and the predetermined symbols in each $k^{th}$ subframe are punctured; and the radio resource is a PDSCH or a PUSCH may be allocated to a user equipment by a PDCCH.

The value for k may be semi-statically configured cell-wide for the secondary component carrier by an eNB via signaling on the primary component carrier.

The method may further comprise an eNB dynamically informing a user equipment, per subframe on the primary component carrier, whether the last m symbols are punctured for a given subframe.

Subframes of the primary component carrier may be time aligned with subframes of the at least one secondary component carrier.

Subframes of the primary component carrier may be offset in time from subframes of the at least one secondary component carrier.

The collision avoidance procedure may comprise a short listen before transmit sensing interval according to a first periodic interval; and utilizing the air interface based collision avoidance procedure may further comprise utilizing a long listen before transmit sensing interval according to a second periodic interval.

The collision avoidance procedure may comprise sending on the secondary component carrier at least one of a request to send RTS message and a clear to send CTS message to indicate that the radio resource is reserved.

The radio resource may be downlink and the method may be executed by an eNB which sends both the request to send RTS message and the clear to send CTS message; or the radio resource may be uplink and the method may be executed by a user equipment which sends both the request to send RTS message and the clear to send CTS message.

The radio resource may be downlink and the method may be executed by an eNB which sends only the clear to send message; or the radio resource may be uplink and the method may be executed by a user equipment which sends only the clear to send message.

The radio resource may be downlink and the method may be executed by a user equipment which sends the clear to send CTS message in reply to a request to send message received from an eNB; or the radio resource may be uplink and the method may be executed by an eNB which sends the clear to send CTS message in reply to a request to send message received from a user equipment.

The method may be executed by an eNB which may determine for the secondary component carrier how to allocate uplink and downlink subframes in a frame.

The method may be executed by an eNB which may first listen during the listen before transmit sensing interval to check if the radio resource is not in use, then may schedule a user equipment for the radio resource in the secondary component carrier, and thereafter may receive data from the user equipment on the scheduled radio resource.

The radio resource may be an uplink resource and the method may be executed by a user equipment which may receive a schedule for the radio resource and thereafter may listen during the listen before transmit sensing interval to check if the radio resource is not in use; the method may further comprise transmitting on the uplink radio resource only if the check finds the radio resource not in use.

The method may further comprise restricting to the primary component carrier retransmissions of data communicated on the radio resource which is negatively acknowledged, in which the retransmissions may identify at least the secondary component carrier and a HARQ process number.

The listen before transmit sensing interval may be restricted to only resource blocks which comprise the radio resource, or a predefined band of resource blocks which may comprise the radio resource.

According to a second aspect of the present invention, an apparatus comprises one or more processors; and one or more memories comprising computer program code. The one or more memories and the computer program code are configured, with the one or more processors, to cause the apparatus to perform at least the following: in a carrier aggregation system comprising multiple component carriers, utilizing an air interface based collision avoidance procedure on at least one component carrier that is associated to a cellular radio access technology to check that a radio resource in the at least one component carrier is available; and thereafter communicating on the radio resource using the cellular radio access technology only if the check reveals that the radio resource is available.

According to a third aspect of the present invention, an apparatus comprises: means for utilizing, in a carrier aggregation system comprising multiple component carriers, an air interface based collision avoidance procedure on at least one component carrier that is associated to a cellular radio access technology to check that a radio resource in the at least one component carrier is available; and means for communicating on the radio resource using the cellular radio access technology only if the check reveals that the radio resource is available.

In an apparatus according to the second or third aspect, the carrier aggregation system may comprise a primary component carrier in a licensed band, and the at least one component carrier may be a secondary component carrier in a license exempt band.

A scheduling grant for the radio resource in the secondary component carrier in the license exempt band may be sent from the primary component carrier in the licensed band.

The collision avoidance procedure may comprise a listen before transmit sensing interval to check if the radio resource is not in use; and a subframe may be defined by the cellular radio access technology.

The listen before transmit sensing interval may comprise m predetermined symbols which may repeat in each $k^{th}$ subframe, where m and k may be each a positive integer.

m=1 and the predetermined symbol may be a last symbol of each $k^{th}$ subframe and the predetermined symbols in each $k^{th}$ subframe may be punctured; and the radio resource may be a PDSCH or a PUSCH allocated to a user equipment by a PDCCH.

The value for k may be semi-statically configured cell-wide for the secondary component carrier by an eNB via signaling on the primary component carrier.

The apparatus may further comprise an eNB dynamically informing a user equipment, per subframe on the primary component carrier, whether the last m symbols are punctured for a given subframe.

Subframes of the primary component carrier may be time aligned with subframes of the at least one secondary component carrier.

Subframes of the primary component carrier may be offset in time from subframes of the at least one secondary component carrier.

The collision avoidance procedure may comprise a short listen before transmit sensing interval according to a first periodic interval; and means for utilizing the air interface based collision avoidance procedure may further comprise means for utilizing a long listen before transmit sensing interval according to a second periodic interval.

The collision avoidance procedure may comprise sending on the secondary component carrier at least one of a request to send RTS message and a clear to send CTS message to indicate that the radio resource is reserved.

The radio resource may be downlink and the apparatus may comprise an eNB which send both the request to send RTS message and the clear to send CTS message; or the radio resource may be uplink and the apparatus may comprise a user equipment which sends both the request to send RTS message and the clear to send CTS message.

The radio resource may be downlink and the apparatus may comprise eNB which sends only the clear to send message; or the radio resource may be uplink and the apparatus may comprise a user equipment which sends only the clear to send message.

The radio resource may be downlink and the apparatus may comprise a user equipment which sends the clear to send CTS message in reply to a request to send message received from an eNB; or the radio resource may be uplink and the apparatus may comprise an eNB which sends the clear to send CTS message in reply to a request to send message received from a user equipment.

The apparatus may comprise an eNB which determines for the secondary component carrier how to allocate uplink and downlink subframes in a frame.

The apparatus may comprise an eNB which first listens during the listen before transmit sensing interval to check if the radio resource is not in use, then schedules a user equipment for the radio resource in the secondary component carrier, and thereafter receives data from the user equipment on the scheduled radio resource.

The radio resource may be an uplink resource and the apparatus may comprise a user equipment which receives a schedule for a radio resource and thereafter listens during the listen before transmit sensing interval to check if the radio resource is not in use; the apparatus may further comprise means for transmitting on the uplink radio resource only if the check finds the radio resource not in use.

The apparatus may further comprise means for restricting to the primary component carrier retransmissions of data communicated on the radio resource which is negatively acknowledged, in which the retransmissions may identify at least the secondary component carrier and a HARQ process number.

The listen before transmit sensing interval may be restricted to only resource blocks which comprise the radio resource, or a predefined band of resource blocks which may comprise the radio resource.

According to a fourth aspect of the present invention, a computer program comprises program code for executing a method including, in a carrier aggregation system comprising multiple component carriers, utilizing an air interface based collision avoidance procedure on at least one component carrier that is associated to a cellular radio access technology to check that a radio resource in the at least one component carrier is available; and thereafter communicating on the radio resource using the cellular radio access technology only if the check reveals that the radio resource is available. The computer program may be a computer program product comprising a computer-readable storage medium bearing computer program code embodied therein for use with a computer.

BRIEF DESCRIPTION OF THE DRAWINGS

For a more complete understanding of the example embodiments of the present invention, reference is now made to the following descriptions taken in connection with the accompanying drawings in which.

DETAILED DESCRIPTION

Future deployments of LTE in the license exempt band are expected to be part of a CA type system with multiple CCs as noted in the background section above. In this case, the PCC DL/UL carriers will be on a licensed band while one or more SCCs may be on license exempt bands, where available. It is preferable that all control information be carried on the PCC to ensure robustness, with the SCC being used for data whenever it is available. The license exempt SCCs in this case may be treated as expansion carriers.

According to an exemplary embodiment of these teachings this license exempt SCC is utilized in an unpaired manner (TD-LTE). But there is no fixed split between UL and DL; the eNB will decide how best to utilize the spectrum and will control the channel utilization by giving either a grant of an UL resource on the SCC or a grant of a DL resource on the SCC. The UE will treat the SCC as if it were a DL channel and only when it receives a grant for an UL resource will it know to use the channel to transmit UL data. The eNB can use conventional metrics such as traffic load, buffer status, traffic characteristics and delay constraint in determining the appropriate number of DL and UL subframes. Alternately, FD-LTE with flexible split can be employed to support dynamic resource split between UL/DL.

The examples below are in the context of LTE with reference to certain techniques for channel access currently used in the WLAN system, but these are only examples of the RATs which may exploit these teachings. More generally, these teachings are not restricted only to operations in license exempt spectrum but may be employed in any system which uses carrier aggregation, whether or not one or more component carriers of that system lie in the license exempt spectrum.

Certain exemplary embodiments of these teachings render the eNB and UE behavior in LTE somewhat similar to the coexistence scheme of WLAN when the LTE devices are using the same frequencies as WLAN. This means that when LTE devices begin to use license exempt frequencies they will not simply attempt to start transmitting but rather first engage in a collision avoidance procedure, for example listening to see if the license exempt channel is available or not. If the license exempt channel is available, then the LTE device (eNB or UE) can begin to use the license exempt channel. In some embodiments this may be facilitated by reservation signals such as RTS and/or CTS.

To deploy LTE in the license exempt band, these teachings provide a medium access control (MAC) layer fairness mechanism, of which the examples below are in two general categories: listen before transmit, and reservation signaling (for example, RTS and/or CTS signaling). These can be considered collision avoidance procedures. But while a coexistence manager function actively controls which device has rights to the license-exempt band for a period of time, in this case the collision avoidance procedure is done on the air interface of the license exempt band, and so there need not be any active coordination between the LTE devices and any WLAN devices operating in the same license-exempt bands. The examples herein can therefore be considered as air-interface based collision avoidance procedures.

In the listen before transmit scheme, a device listens to the channel for a period of time and if it observes no ongoing transmission the listening device can start its transmission. For example, the listening LTE device can measure signal power it observes on the license exempt band, or if so equipped it can use a WLAN receiver directly which can also provide information about the length of any ongoing frame exchanges.

In the RTS/CTS scheme the device listens to the channel for a period of time and if it senses no ongoing transmission the listening device sends a RTS message to its intended destination device. The destination device then responds with a CTS message and then data transmission can occur. The RTS and CTS messages inform other devices that the channel will be in use for the duration of data transmission and acknowledgment and hence also perform the function of reserving the channel for that duration. According to this teaching, the RTS and/or CTS messages can be used strictly for channel reservation. In such an implementation, a CTS response to an RTS message is not strictly required and a CTS message can be transmitted as a standalone message without a preceding RTS transmission. The co-existence solutions according to these teachings are thus based on adapting a WLAN-type sensing mechanism (both physical and virtual) to reduce the chance of collisions, and utilizing the license exempt SCC for data only when the collision avoidance procedure on the air interface indicates the license exempt channel is free.

As noted above, it is preferable that all control information be on the PCC (or on some SCC in the licensed band) so as not to sacrifice robustness of the control signaling. This means the PDCCH will be on the PCC (or other licensed band CC) as well as any acknowledgements sent UL by the UE or DL by the eNB, even if those acknowledgements correspond to a PDSCH or PUSCH on the license exempt SCC. Alternately, some limited control signaling associated with scheduling can be carried on the SCC using the ePDCCH channel.

HARQ is used to allow retransmission of data packets that were not successfully decoded at the receiver. In the case that a retransmission of data packets sent on the license exempt SCC is required, they may have to be transmitted on the PCC to ensure that a retransmission can be sent at a specific time. In this case, the appropriate control channel format must be defined to add appropriate information about HARQ and SCC number from the first transmission which failed.

The air interface collision avoidance procedures may be considered to reserve the channel. For example, in orthogonal frequency division multiplexing WLAN modes the short interframe spacing (the shortest time between consecutive frames) is 16 μs; the RTS, CTS, and acknowledgement frames are each 24 μs long; and the random back-off time slots are 9 μs each. There is a SIFS between the RTS and the CTS. After sensing that there is activity on the channel, a device wishing to transmit listens for further activity for the time of a DIFS (distributed coordination function interframe space) time plus a number of (randomly determined) back-off slots. The DIFS is the length of the SIFS+2*time-slot length, so in the above example it is 16+2*9=34 μs. If no activity is detected the device can begin transmission after its internal timer has elapsed.

Figure 3:
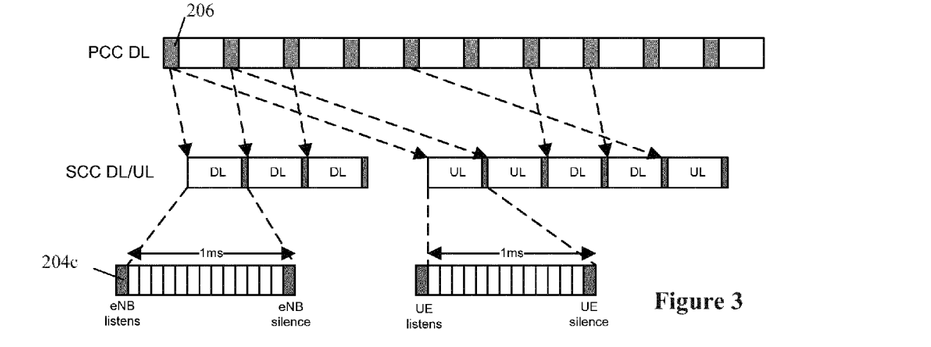
FIG. 3 is similar to FIG. 2 but in which the subframes in the PCC and in the SCC are offset from one another in time.
Figure 4:
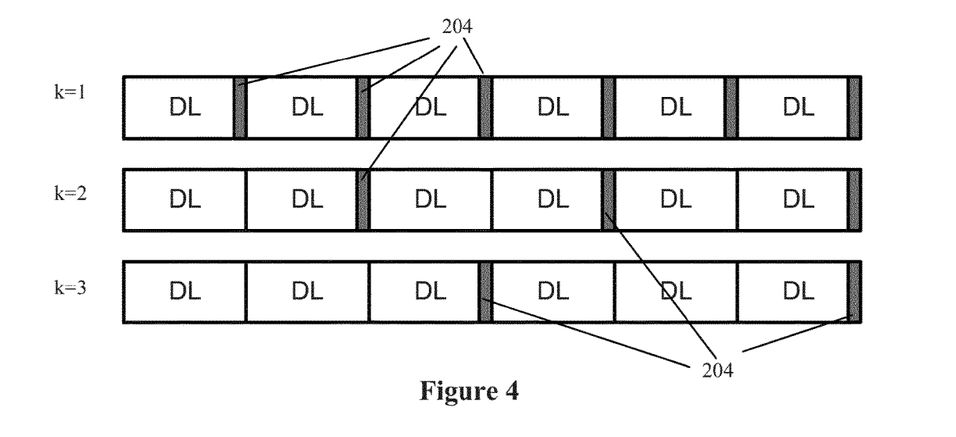
FIG. 4 illustrates four different pre-determined periodic intervals which may be imposed for the listen before transmit channel sensing procedure detailed for FIGS. 2 and 3.
Figure 5:
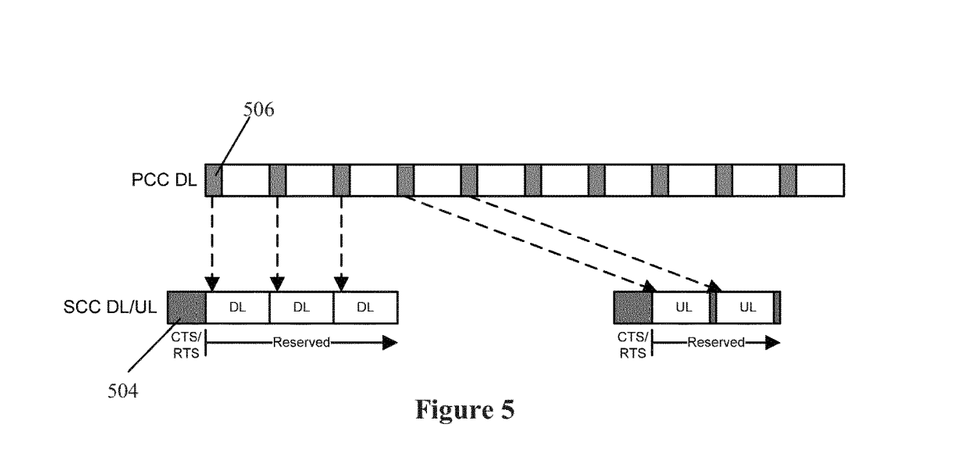
FIG. 5 is a schematic diagram of radio subframes in the PCC and in the SCC and in which there is a request to send/clear to send messaging procedure on the SCC before utilizing SCC resources.

The RTS/CTS signaling is detailed with respect to FIG. 5 and may be used as noted above after some listen before transmit interval which are detailed with respect to FIGS. 2, 3, 4 and 6. In one embodiment there is only a listen before transmit procedure without additional RTS/CTS signaling.

Figure 2:
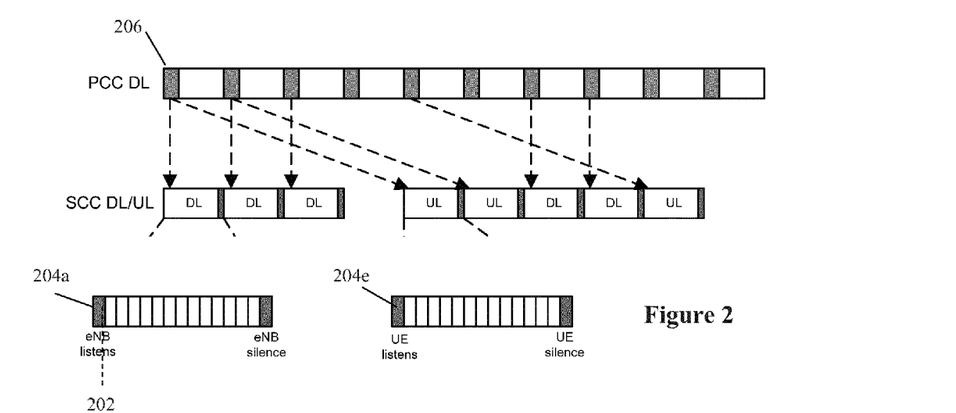
FIG. 2 is a schematic diagram of radio subframes in the PCC and in the SCC which are time-aligned and in which there is a listen before transmit channel sensing procedure on the SCC before utilizing SCC resources and the SCC is shown separately for both a DL subframe and a UL subframe.

In the FIG. 2 embodiment the listen before transmit procedure occurs at a periodic interval of the last m symbols of each subframe where m is an integer at least one; the eNB listens to the license exempt channel in the SCC to check if the channel is in use. For example, assume a UE configured with a discontinuous reception DRX interval is scheduled to listen to see if it has a PDCCH addressed to it at the start 202 of a given subframe as shown at FIG. 2. The eNB would like to schedule that UE for radio resources on the license exempt SCC and so assuming m=1 will listen in the last symbol 204a of the immediately preceding subframe. During this last symbol 204a the eNB will do channel sensing to check if the license exempt channel is in use, and if not the eNB can send to the UE on the PCC a PDCCH 206 which schedules it for DL radio resources on the license exempt SCC.

The PCC and SCC are time-aligned in this example, and specifically in the FIG. 2 case the DL grant 206 is time-aligned to the SCC and sensing is done beforehand so the eNB can be sure that there is no on-going transmission in the SCC when it sends the PDCCH schedule 206. If for example the PDCCH 206 of FIG. 2 allocated a PUSCH to the UE then still assuming m=1 the UE will listen in the last symbol 204e of the subframe prior to transmitting on its scheduled resource as shown at the right side of FIG. 2A.

In FIG. 3 the timing of the SCC is delayed or otherwise offset from the PCC, though still synchronized. In this case, the PDCCH grant 206 is given in the PCC but the eNB will have to listen to the SCC before deciding whether it can transmit the DL data to the UE. In the event the eNB senses that there is some other transmission, it will have to abort its scheduled DL transmission PDSCH 208 in the SCC. In the event that the transmission is aborted, the eNB can schedule another transmission as soon as possible without having to wait for the feedback from the UE.

For each of FIGS. 2 and 3, to be consistent with current LTE timing the UL PUSCH is scheduled four frames beforehand. The UE will have to sense the channel prior to its actual PUSCH transmission. If it senses some other ongoing transmission the UE will then refrain from sending its scheduled uplink data. In conventional LTE the last symbol of the subframe can be punctured for sounding reference symbols SRS, which means puncturing that same last symbol for listen before transmit purposes does not mean that legacy UEs cannot be supported when these teachings are adopted in a practical system. But those legacy LTE UEs may not be aware of the sensing requirement and thus may generate interference to nearby systems.

Each of FIGS. 2-3 have the radio resources on the SCC scheduled from a PDCCH sent on the PCC. This is but one non-limiting example. In another embodiment the scheduling of radio resources on the SCC may be done via a scheduling grant sent on the SCC itself, such as for example an enhanced downlink physical control channel ePDCCH.

To reduce overhead it is not necessary in the DL to puncture the last m symbols of every subframe. Instead, the last m symbols of every k-th subframe can be punctured to allow for sensing. With this consideration the embodiments of FIGS. 2 and 3 then represent the case where k=1 as shown in the first row of FIG. 4. The center row of FIG. 4 illustrates k=2 and the lowermost row illustrates k=3, where the silence symbol is denoted as 204. Having the option of k being greater than one allows the eNB to transmit in batches of k subframes and thus reduce the overhead associated with carrier sensing. In addition, legacy LTE UEs can receive DL transmission in the subframes that are not punctured by a listen before transmit silence period. For the case in which the eNB does not have DL data to transmit in one of the subframes, then it must sense the license exempt channel before resuming transmission.

For all of the above listen before transmit examples the silence symbol was periodic in that the puncturing pattern was the last symbol of each kth subframe. These patterns are configured system/cell-wide in a semi-static manner (for example, the value of k may be broadcast in a system information block) and all capable UEs observe the same pattern. In another embodiment the DL symbol puncturing is done dynamically by the eNB which dynamically informs the UEs in each relevant DL subframe that the last symbol is punctured. This can be done using a broadcast channel similar to the physical control format indicator channel (PCFICH) in LTE, or by introducing a new bit in the downlink control information (PDCCH) for this purpose. This enables the eNB to hold the license exempt channel for multiple subframes without incurring the overhead needed for always sensing in each subframe.

In the above examples there was a listen before transmit symbol (or plural symbols) and RTS/CTS signaling could optionally be used to protect the scheduled resource in the license exempt channel. But in another embodiment the RTS/CTS procedure can be used in place of the listen before transmit procedure. There is still a period of listening before transmitting the RTS and CTS messages to reserve the channel.

In one example of this embodiment the RTS/CTS is implemented by leaving the last symbol 504 of the UL subframe silent in order to allow the UE to do channel sensing of the license exempt channel as is shown at FIG. 5. In this case, the eNB will send both RTS and CTS signals. When the RTS/CTS protocol is used no additional sensing is needed on the DL since the channel can be reserved ahead of time, similar to use the RTS/CTS procedure to protect the already-scheduled resources on the channel as detailed above. For this embodiment if there is a timing difference between PCC and the SCC the reserved time indicated in the RTS header can also include this timing difference.

At the left side of FIG. 5 the PDCCH 506 allocates a PDSCH for the UE which is reserved by the RTS/CTS signaling at 504. For the case in which the PDCCH allocates a PUSCH for the UE as shown at the right side of FIG. 5, even though the channel is reserved it is possible that the UE's UL transmission will interfere with nearby systems due to nodes that cannot hear the RTS/CTS transmission from the eNB. This is well known in the wireless arts as the hidden node problem. In this case, the UE will additionally sense the channel (listen before transmit) first before sending its UL transmission on the allocated and reserved UL resource, for each allocated UL subframe as shown by the shading at the right side of FIG. 5.

In the RTS/CTS embodiment immediately above the eNB transmitted both the RTS and the CTS prior to sending the PDCCH to the UE. This may be modified somewhat in that the eNB does not need to transmit the RTS but only the CTS. This reduces unnecessary transmission and the overhead. It also allows other systems more opportunity to transmit their data.

Respecting the listen before transmit procedure, whether by the eNB as in FIGS. 2 and 3 or by the UE prior to sending its UL data in FIG. 5, it is advantageous to limit the channel sensing to only the assigned resource blocks, or possibly a few adjacent ones beyond the assigned resource blocks. For example, if the UE is scheduled for UL transmission in resource blocks 8-12, it will only need to sense whether there is any other transmission in the frequency range of resource blocks 6-14 rather than the entire bandwidth. If no ongoing transmission is detected in that frequency range, then the UE is free to transmit. In these implementations, the listen before transmit sensing interval is limited only to the resource block(s) which comprises the scheduled radio resource, or to a predefined band of resource blocks which comprise the scheduled radio resource. In one particular embodiment the predefined band may be specified in implementing radio protocols. For the above example such a specified predefining may mandate that if there are between 4 and 8 resource blocks scheduled the channel sensing eNB or UE will perform channel sensing on those scheduled physical resource blocks and additionally on two frequency-adjacent physical resource blocks on each side of the scheduled blocks.

Figure 6:
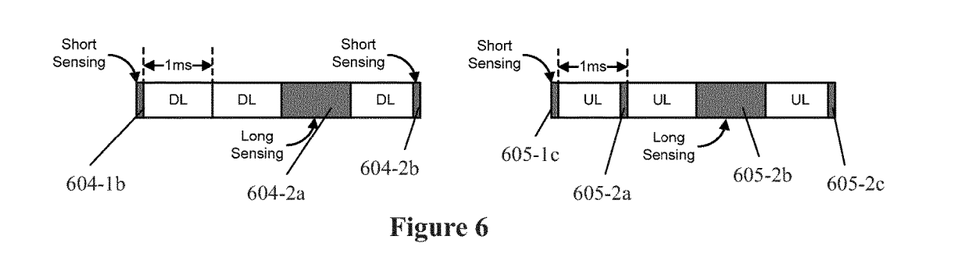
FIG. 6 is a schematic diagram of radio subframes in the SCC in which there are two different-length listen before transmit intervals for the channel sensing procedure.

The periodic pattern of listen before transmit symbols may be made up of different length listening intervals as shown at FIG. 6. At the left side for the DL there is a periodic interval spanning four subframes, a longer listen before transmit sensing interval 604-2a and a shorter listen before transmit sensing interval 604-2b. The shorter sensing interval 604-1b from the last repeating period is also shown for context. The right side of FIG. 6 illustrates that there can be a different number of shorter and longer sensing intervals in any given periodic interval, but there must be a sensing interval before every UL transmission. Specifically, for the four UL subframe periodic interval there are two shorter sensing intervals 605-2a and 605-2c and one longer sensing interval 605-2b. The final shorter sensing interval 605-1c from the previous periodic interval is also shown for context. In one implementation the shorter sensing interval is one symbol and the longer sensing interval is one subframe. The shorter sensing interval can be used to sense the license exempt channel in a fast manner while the longer sensing interval can be used to detect weaker transmissions from other systems such as WLAN devices, and helps to alleviate the hidden node problem noted above. This also provides more opportunities for other systems to transmit on the license exempt band and varying the length and frequency of the longer sensing interval can be used to adjust the fairness of the LTE system's utilization of the license exempt band.

Figure 7:
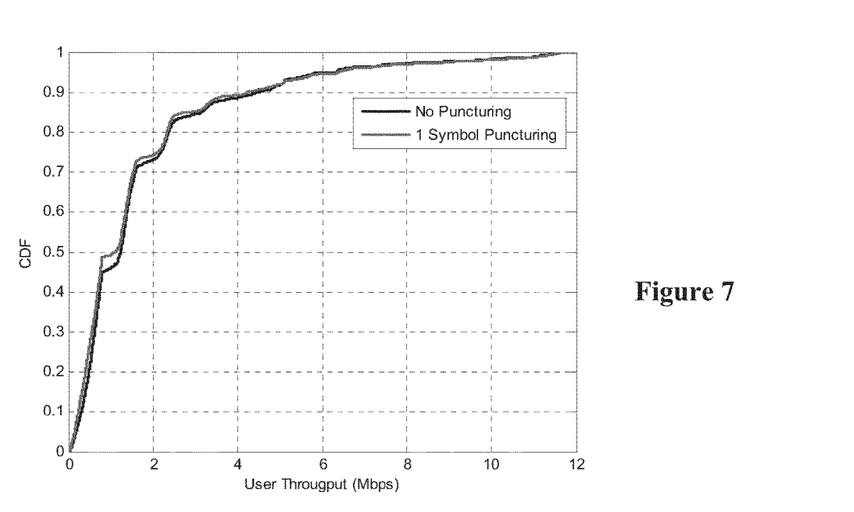
FIG. 7 is a graph of cumulative density function CDF (vertical axis) versus user throughput (horizontal axis) comparing no puncturing to 1-symbol puncturing for carrier sensing as in FIGS. 2 and 3.

FIG. 7 illustrates the potential performance loss when m=1 symbol is punctured as detailed above for carrier sensing purposes. In this case, LTE is deployed in the license exempt band in randomly placed pico cells using an expansion carrier, and only the last symbol of every uplink subframe is punctured to allow for channel sensing so m=1. The cumulative density function CDF of uplink user throughput is shown as compared to no puncturing, and FIG. 7 shows the performance is similar since users enjoy a high signal to interference plus noise ratio SINR and can compensate by using higher power for the higher coding rate which results from losing one symbol.

Figure 8:
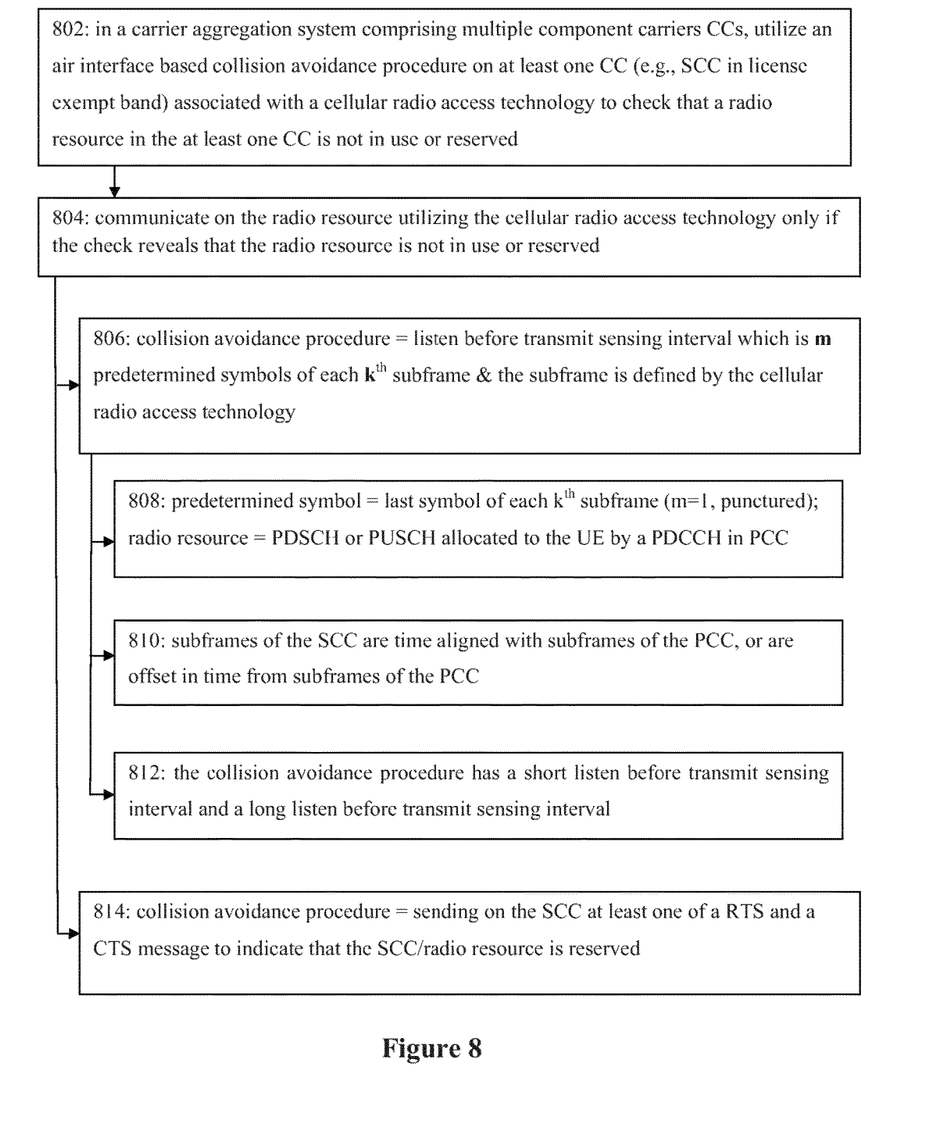
FIG. 8 is an exemplary flow diagram illustrating various embodiments of the invention from the perspective of the UE and of the eNB/network node.

The above embodiments are summarized and assembled at FIG. 8, which is a logic flow diagram that illustrates the operation of a method, and a result of execution of computer program instructions, in accordance with the exemplary embodiments of this invention. In accordance with these exemplary embodiments at block 802, in a carrier aggregation system comprising multiple component carriers, an air interface based collision avoidance procedure is utilized on at least one of the multiple component carriers and that component carrier is associated with a cellular radio access technology. The collision avoidance procedure is to check that a radio resource is available. The radio resource is in second component carrier (for example, a secondary component carrier in a license exempt band) and as detailed above in one embodiment it is scheduled from a first component carrier (for example, a primary component carrier in a licensed band) and in another embodiment it is scheduled from that same component carrier (by an ePDCCH for example). Then at block 804 the cellular radio access technology is used for communicating on the radio resource only if the check of block 802 reveals that the radio resource is available.

In the carrier aggregation system the collision avoidance procedure is used on only one (or some) but not all of the multiple component carriers. That is, if there are a total of x component carriers in the carrier aggregation system, then the collision avoidance procedure is used only on y of them, where y is less than x and both x and y are positive integers.

Remaining blocks of FIG. 8 are optional particular embodiments, any of which may be combined with blocks 802 and 804. Certain of those optional blocks read on both the network side and the UE side of the wireless divide, and others of them read on only one or the other.

Block 806 describes that the collision avoidance procedure of block 802 comprises a listen before transmit sensing interval to check if the radio resource is not in use, and that the listen before transmit sensing interval comprises m predetermined symbols of each $k^{th}$ subframe (where m and k are each a positive integer), and that the subframe is defined by the cellular radio access technology. Note that this covers the above examples where the eNB checks the SCC before sending the PDCCH on the PCC as well as where the UE checks the resource blocks in the vicinity of the allocated UL resource(s) before transmitting on the SCC.

Block 808 further modifies block 806 in that the m predetermined symbols is a last symbol of each $k^{th}$ subframe (m=1) and the predetermined symbols are punctured (that is, no data is transmitted in that symbol position), and the radio resource is a PDSCH or a PUSCH allocated to the user equipment by a PDCCH (or alternatively by an ePDCCH). As detailed above, the value for k which applies for the secondary component carrier may be semi-statically configured cell-wide by a network access node (such as an eNB in the LTE system) via signaling on the primary component carrier. As was also detailed above, k may be one and the UE is dynamically informed per subframe by an access node/eNB on the primary component carrier whether for a given subframe the last symbol is punctured (or last m symbols for the case m is greater than 1).

Block 810 summarizes the embodiments of FIGS. 2 and 3 in that the subframes of the secondary component carrier may be time aligned with subframes of the primary component carrier, or they may be offset in time from subframes of the primary component carrier.

Block 812 briefly reviews the FIG. 6 embodiment in which the collision avoidance procedure comprises a short listen before transmit sensing interval and a long listen before transmit sensing interval (in this case short and long are relative to one another). These may have different periodicities/periodic intervals (first and second periodic intervals) as shown at FIG. 5 which had for the UL one long and two short sensing intervals.

For the other embodiments in which RTS and/or CTS is used instead of listen before transmit to check the channel, block 814 details that the collision avoidance procedure of block 802 comprises sending on the second component carrier at least one of a request to send RTS message and a clear to send CTS message to indicate to other users that the radio resource/channel is reserved. In this case if the radio resource is DL the eNB may send both the RTS and the CTS messages, or it may send only the CTS message and the RTS message is not used for the checking of block 802 (that is, the eNB sends the CTS message in the absence of sending or receiving any RTS message). For the case the radio resource is UL then for these embodiments it is the UE which sends both the RTS and the CTS messages, or only the CTS message. Or for a DL resource the eNB may send the RTS and the UE replies with the CTS; alternatively for an UL resource the UE sends the RTS and the eNB sends the CTS.

Not specifically repeated at FIG. 8 but detailed above, in some embodiments the eNB determines for the secondary component carrier how to allocate UL and DL subframes in a radio frame. And also the eNB first listens during the listen before transmit sensing interval to check if the radio resource is not in use; then schedules a UE for the radio resource in the secondary component carrier, and thereafter receives data from the UE on the scheduled radio resource. From the UE's perspective if the radio resource is UL the UE receives the schedule for the radio resource and thereafter listens during the listen before transmit sensing interval to check if the radio resource is not in use; only if the check finds the radio resource not in use will the UE transmit on that UL radio resource.

Also above were detailed embodiments in which all retransmissions of data communicated on the radio resource, where the data is negatively acknowledged (NACK'd), are restricted to the primary component carrier. In this case each retransmission also identifies at least the secondary component carrier on which the NACK's data was first transmitted, and a HARQ process number or index. For the listen before transmit embodiments, the sensing interval may in different embodiments be restricted to only resource blocks which comprise the radio resource, or restricted to a predefined band of resource blocks which comprise the radio resource.

The various blocks shown in FIG. 8 may be viewed as method steps, and/or as operations that result from operation of computer program code embodied on a memory and executed by a processor, and/or as a plurality of coupled logic circuit elements constructed to carry out the associated function(s).

Figure 9:
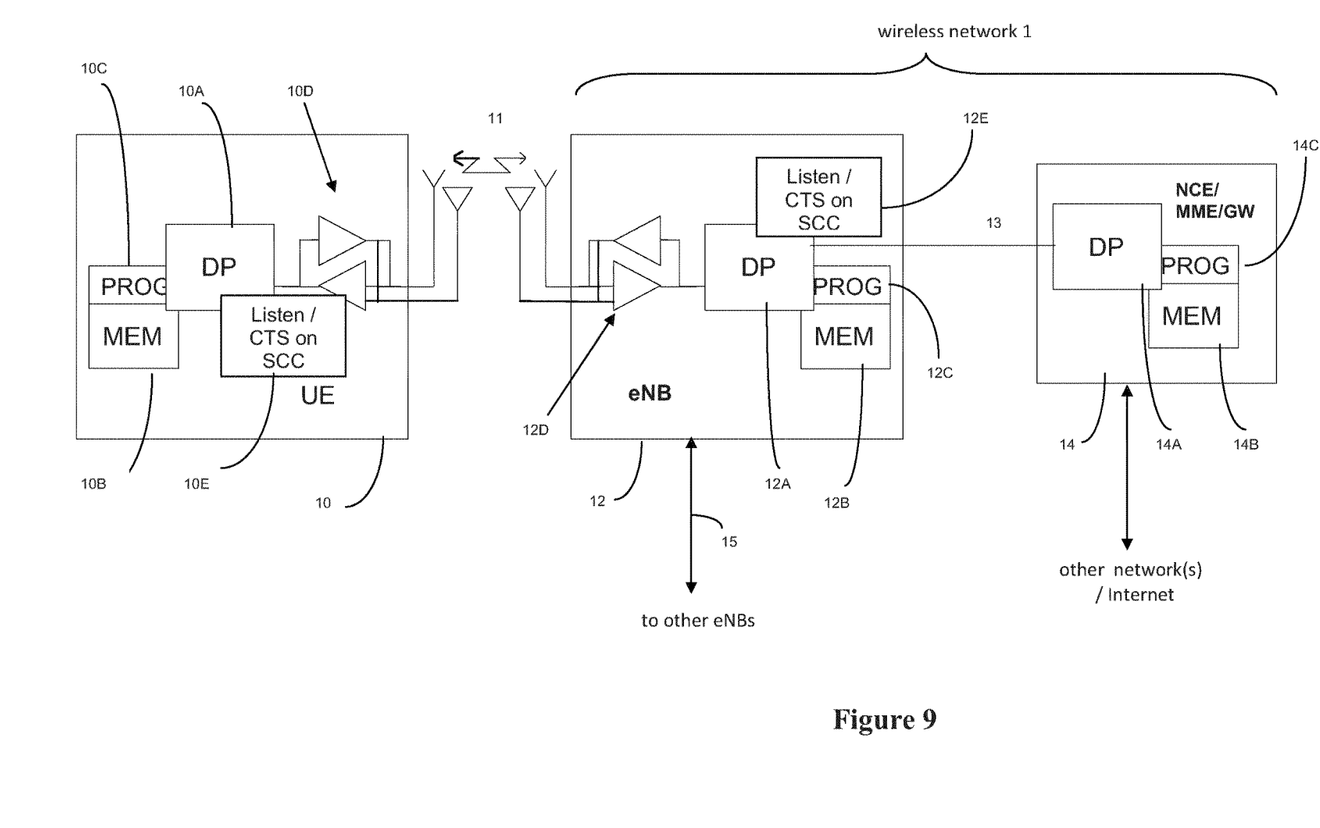
FIG. 9 is a simplified block diagram of a UE and an eNB which are exemplary electronic devices suitable for use in practicing the exemplary embodiments of the invention.

Reference is made to FIG. 9 for illustrating a simplified block diagram of various electronic devices and apparatus that are suitable for use in practicing the exemplary embodiments of this invention. In FIG. 9 a wireless network 1 is adapted for communication over a wireless link 11 with an apparatus, such as a mobile communication device which above is referred to as a UE 10, via a network access node, such as a Node B (base station), and more specifically an eNB 12. The network 1 may include a network control element (NCE) 14 that may include mobility management entity/serving gateway MME/S-GW functionality that is specified for LTE/LTE-A. The NCE 14 also provides connectivity with a different network, such as a publicly switched telephone network and/or a data communications network (e.g., the Internet).

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNB 12 via one or more antennas (two shown). The eNB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas (also two shown). The eNB 12 is coupled via a data/control path 13 to the NCE 14. The path 13 may be implemented as the S1 interface known in LTE/LTE-A. The eNB 12 may also be coupled to another eNB via data/control path 15, which may be implemented as the X2 interface known in LTE/LTE-A.

At least one of the PROGs 10C and 12C is assumed to include program instructions that, when executed by the associated DP, enable the device to operate in accordance with the exemplary embodiments of this invention, as detailed above. That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a program or algorithm to cause the eNB/UE to listen and/or send RTS/CTS signaling on the license exempt SCC as shown at 10E and 12E of FIG. 9, according to the non-limiting examples presented above.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in embodied firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, embodied software and/or firmware, special purpose circuits or logic, general purpose hardware or controller or other computing devices, or some combination thereof, where general purpose elements may be made special purpose by embodied executable software.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

While the exemplary embodiments have been described above in the context of the LTE-Advanced system, it should be appreciated that the exemplary embodiments of this invention are not limited for use with only this one particular type of wireless communication system that uses carrier aggregation.

Further, the various names used for the described parameters and channels (e.g., PDCCH, PDSCH, PUSCH) are not intended to be limiting in any respect, as these parameters may be identified by any suitable names. The use of LTE-A in the specific examples is not limiting to the broader aspects of this invention, which are viable for many CA systems apart from LTE-A which use cross-scheduling.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

Acronyms used in the above description and/or the drawing figures are defined as follows:
3GPP third generation partnership project
ACK/NACK acknowledge/negative acknowledge
CA carrier aggregation
CC component carrier
CTS clear to send
DL downlink
eNB node B/base station in an E-UTRAN system
ePDCCH enhanced physical downlink control channel
E-UTRAN evolved UTRAN (LTE)
FD frequency domain
HARQ hybrid automatic repeat request
LTE long term evolution
LTE-A long term evolution-advanced
PCC primary component carrier
PCFICH physical control format indicator channel
PDCCH physical downlink control channel
PDSCH physical downlink shared channel
PUCCH physical uplink control channel
PUSCH physical uplink shared channel
RAT radio access technology
RTS request to send
SCC secondary component carrier
TD time domain
TVWS television whitespace(s)
UE user equipment UL uplink
UTRAN universal terrestrial radio access network
WLAN wireless local area network

What is claimed is:

1. A method, comprising:
in a carrier aggregation system comprising multiple component carriers, wherein the carrier aggregation system comprises at least one component carrier in a licensed band and at least one other component carrier in a license exempt band, utilizing an air interface based collision avoidance procedure on a subset of the component carriers used in carrier aggregation, the subset of the component carriers associated to a cellular radio access technology, to check that a radio resource in the at least one component carrier is not in use; and thereafter
communicating on the radio resource in the at least one component carrier using the cellular radio access technology only if the check reveals that the radio resource in the at least one component carrier is not in use, wherein a scheduling grant for a radio resource in the license exempt band is sent from the at least one component carrier in the licensed band or sent from the at least one other component carrier in the license exempt band, and wherein subframes of the at least one component carrier on the licensed band are time aligned with subframes of the at least one other component carrier on the license exempt band,
wherein the collision avoidance procedure comprises a listen before transmit sensing interval to check if the radio resource in the license exempt band is not in use,
wherein the radio resource in the license exempt band is an uplink resource and the method is executed by a user equipment which receives a schedule for the radio resource in the license exempt band and thereafter listens during the listen before transmit sensing interval to check if the radio resource in the license exempt band is not in use,
and wherein the method further comprises transmitting on the uplink resource only if the check finds the radio resource in the license exempt band not in use.

2. The method according to claim 1, wherein:
the listen before transmit sensing interval comprises m predetermined symbols which repeats in each kth subframe, where m and k are each a positive integer.

3. The method according to claim 1, wherein the subframes of the at least one component carrier on the licensed band are offset in time from the subframes of the at least one other component carrier on the license exempt band.

4. The method according to claim 1, wherein: the collision avoidance procedure comprises sending on the at least one other component carrier at least one of a request to send RTS message and a clear to send CTS message to indicate that the radio resource in the license exempt band is reserved.

5. The method according to claim 1, wherein the method is executed by an eNB which determines for the at least one other component carrier on the license exempt band how to allocate uplink and downlink subframes in a frame.

6. A computer program embodied on a non-transitory computer-readable medium containing program code for executing the method according to claim 1 when the computer program is run on a computer.

7. An apparatus, comprising:
one or more processors; and
one or more memories including computer program code, the one or more memories and the computer program code configured, with the one or more processors, to cause the apparatus to perform at least following:
in a carrier aggregation system comprising multiple component carriers, wherein the carrier aggregation system comprises at least one component carrier in a licensed band and at least one other component carrier in a license exempt band, utilizing an air interface based collision avoidance procedure on a subset of the component carriers used in carrier aggregation, the subset of the component carriers associated to a cellular radio access technology, to check that a radio resource in the at least one component carrier is not in use; and thereafter
communicating on the radio resource in the at least one component carrier using the cellular radio access technology only if the check reveals that the radio resource in the at least one component carrier is not in use, wherein a scheduling grant for a radio resource in the license exempt band is sent from the at least one component carrier in the licensed band or sent from the at least one other component carrier in the license exempt band, and wherein subframes of the at least one component carrier on the licensed band are time aligned with subframes of the at least one other component carrier on the license exempt band,
wherein the collision avoidance procedure comprises a listen before transmit sensing interval to check if the radio resource in the license exempt band is not in use,
wherein the radio resource in the license exempt band is an uplink resource and the apparatus comprises a user equipment which receives a schedule for the radio resource in the license exempt band and thereafter listens during the listen before transmit sensing interval to check if the radio resource in the license exempt band is not in use,
wherein the one or more memories and the computer program code are further configured, with the one or more processors, to cause the apparatus to transmit on the uplink resource only if the check finds the radio resource in the license exempt band not in use.

8. The apparatus according to claim 7, wherein:
the listen before transmit sensing interval comprises m predetermined symbols which repeats in each kth subframe, where m and k are each a positive integer.

9. The apparatus according to claim 7, wherein the subframes of the at least one component carrier on the licensed band are offset in time from the subframes of the at least one other component carrier on the license exempt band.

10. The apparatus according to claim 7, wherein: the collision avoidance procedure comprises sending on the at least one other component carrier at least one of a request to send RTS message and a clear to send CTS message to indicate that the radio resource in the license exempt band is reserved.

11. The apparatus according to claim 7, wherein the apparatus comprises an eNB which determines for the at least one other component carrier on the license exempt band how to allocate uplink and downlink subframes in a frame.

* * * * *